(12) United States Patent
Saruwatari et al.

(10) Patent No.: US 8,053,088 B2
(45) Date of Patent: Nov. 8, 2011

(54) SLIDE MEMBER

(75) Inventors: Kouichi Saruwatari, Inuyama (JP);
Yukihiko Kagohara, Inuyama (JP);
Tomoyuki Nirasawa, Inuyama (JP)

(73) Assignee: Daido Metal Company Ltd., Aichi-Ken (JP)

( * ) Notice: Subject to any disclaimer, the term of this patent is extended or adjusted under 35 U.S.C. 154(b) by 189 days.

(21) Appl. No.: 12/489,071

(22) Filed: Jun. 22, 2009

(65) Prior Publication Data

US 2009/0317654 A1   Dec. 24, 2009

(30) Foreign Application Priority Data

Jun. 20, 2008   (JP) .................. 2008-161721

(51) Int. Cl.
*B23K 35/00* (2006.01)
*B32B 15/01* (2006.01)
*B32B 15/10* (2006.01)
*B32B 3/24* (2006.01)
*B32B 15/00* (2006.01)
*F16C 33/12* (2006.01)

(52) U.S. Cl. ........ 428/654; 428/650; 428/612; 428/652; 384/912

(58) Field of Classification Search .................. 428/612, 428/615, 650, 654, 620, 641, 652; 420/528, 420/529, 531–534, 537, 540–542, 546, 548; 384/912
See application file for complete search history.

(56) References Cited

U.S. PATENT DOCUMENTS

| | | |
|---|---|---|
| 3,896,009 A | 7/1975 | Kobayashi et al. |
| 5,129,378 A | 7/1992 | Donahue et al. |
| 6,221,515 B1 * | 4/2001 | Ramos Junior et al. ...... 428/653 |
| 7,074,496 B2 * | 7/2006 | Kagohara et al. ............. 428/654 |
| 7,229,699 B2 * | 6/2007 | Toth et al. ..................... 428/559 |

FOREIGN PATENT DOCUMENTS

| | | |
|---|---|---|
| EP | 1715084 | 10/2006 |
| JP | 58-094631 A | 6/1983 |
| JP | 3113175 | 5/1991 |
| JP | 05-025682 A | 2/1993 |
| JP | 07-259863 A | 10/1995 |

(Continued)

OTHER PUBLICATIONS

Dr. Dmitri Kopeliovich, "Continuous Casting of Aluminum Based Bearing Alloys", SubsTech Website.*

*Primary Examiner* — Jennifer McNeil
*Assistant Examiner* — Clarisa M Carrizales
(74) *Attorney, Agent, or Firm* — Browdy and Neimark, PLLC

(57) ABSTRACT

A slide member provided with an Al-based alloy layer including Si and having a first contoured surface having first planar surfaces and first convexities consisting of Si particles protruding from the first planar surfaces; an intermediate layer that coats the Al-based alloy layers an overlay that coats the intermediate layer; wherein 90% or more of the Si particles protruding from the first planar surfaces are configured to have a predetermined particle diameter of 2 μm or less, the Si particles having the predetermined particle diameter being distributed in the Al-based alloy layer with a distance between centers of gravity of the Si particles having the predetermined particle diameter averaging 6 μm or less, and wherein the overlay has a second contoured surface having second planar surfaces and second convexities conforming with the first planar surfaces and the first convexities of the first contoured surface.

9 Claims, 9 Drawing Sheets

| | FOREIGN PATENT DOCUMENTS | | |
|---|---|---|---|
| JP | 10-077968 A | 3/1998 | |
| JP | 11050296 A * | 2/1999 | |
| JP | 11-172465 A | 6/1999 | |
| JP | 2000-064085 A | 2/2000 | |
| JP | 2003-119530 A | 4/2003 | |
| JP | 2004-360779 A | 12/2004 | |
| JP | 2006-291885 A | 10/2006 | |
| JP | 2007-271084 A | 10/2007 | |

* cited by examiner

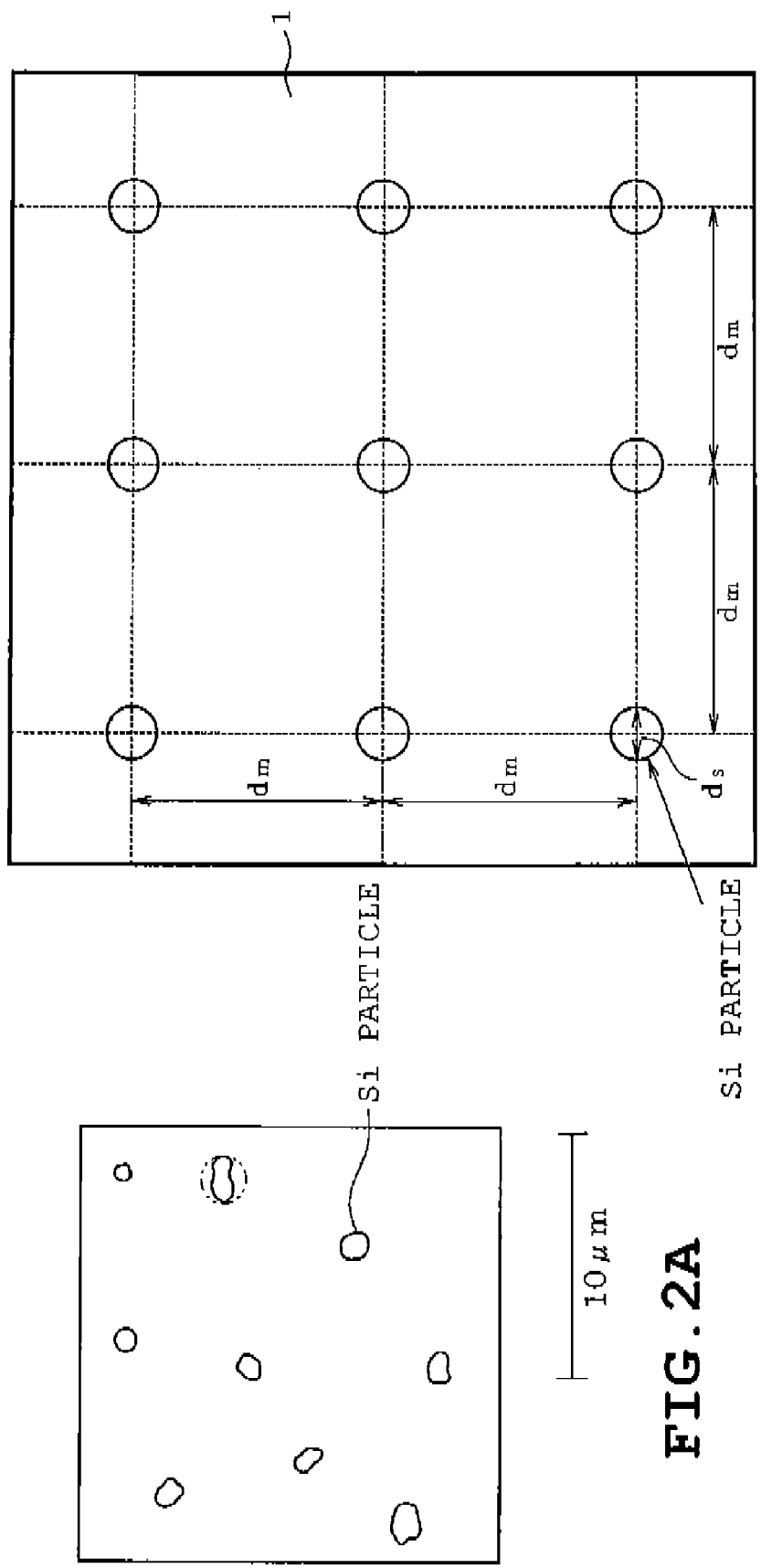

| | SAMPLE NO. | Al-BASED BEARING ALLOY LAYER COMPONENTS (MASS%) | | | | | COOLING SPEED IN CASTING (°C/sec) |
| --- | --- | --- | --- | --- | --- | --- | --- |
| | | Al | Zn | Si | Cu | Mg | |
| EXEMPLARY EXPERIMENTS | 1 | REST | 6.0 | 3.0 | 1.2 | 1.0 | 50 |
| | 2 | REST | 6.0 | 4.0 | 1.2 | 1.0 | 50 |
| | 3 | REST | 6.0 | 4.0 | 1.2 | 1.0 | 40 |
| | 4 | REST | 6.0 | 8.0 | 1.2 | 1.0 | 30 |
| | 5 | REST | 6.0 | 3.0 | 1.2 | 1.0 | 50 |
| | 6 | REST | 6.0 | 3.0 | 1.2 | 1.0 | 50 |
| | 7 | REST | 6.0 | 8.0 | 1.2 | 1.0 | 30 |
| | 8 | REST | 6.0 | 8.0 | 1.2 | 1.0 | 30 |
| | 9 | REST | 6.0 | 3.0 | 1.2 | 1.0 | 50 |
| | 10 | REST | 6.0 | 3.0 | 1.2 | 1.0 | 50 |
| | 11 | REST | 6.0 | 8.0 | 1.2 | 1.0 | 50 |
| COMPARATIVE EXPERIMENTS | 1 | REST | 6.0 | 0.0 | 1.2 | 1.0 | 50 |
| | 2 | REST | 6.0 | 4.0 | 1.2 | 1.0 | 30 |
| | 3 | REST | 6.0 | 10.0 | 1.2 | 1.0 | 50 |
| | 4 | REST | 6.0 | 4.0 | 1.2 | 1.0 | 20 |

FIG. 6

| ANTI-SEIZURE TEST CONDITIONS | |
|---|---|
| ROTATION COUNT | 7200rpm |
| TEST LOAD | INCREASED BY 10MPa AT EVERY 10 MINUTES |
| OIL SUPPLY TEMPERATURE | 100°C |
| OIL SUPPLY | 150cc/min |
| LUBRICANT OIL | VG22 |
| SHAFT MATERIAL | S55C |
| MAXIMUM SURFACE PRESSURE WITHOUT SEIZURE | SURFACE PRESSURE ONE STEP LOWER THAN SURFACE PRESSURE AT WHICH REARSIDE SURFACE TEMPERATURE OF SAMPLES EXCEED 200 °C OR SURFACE PRESSURE ONE STEP LOWER THAN SURFACE PRESSURE AT WHICH SHAFT DRIVE BELT SLIPS BY TORQUE VARIANCE |

FIG. 7

| | SAMPLE NO. | PERCENTAGE (%) OF 2 μm OR LESS Si PARTICLES | AREA COVERAGE (%) OF Si PARTICLES | PLATING THICKNESS (μm) INTERMEDIATE LAYER | PLATING THICKNESS (μm) OVERLAY | $d_s$ (μm) | $d_m$ (μm) | $t_{s1}$ (μm) | $t_{s2}$ (μm) | $t_{s3}$ (μm) | $d_a$ (μm) | $d_x$ (μm) MINIMUM | $d_x$ (μm) MAXIMUM | MAXIMUM SURFACE PRESSURE WITHOUT SEIZURE (MPa) |
|---|---|---|---|---|---|---|---|---|---|---|---|---|---|---|
| EXEMPLARY EXPERIMENTS | 1 | 95 | 2.0 | 3 | 6 | 1.2 | 6.0 | 0.48 | 0.38 | 0.31 | 4.8 | 4.80 | 6.00 | 90 |
| | 2 | 95 | 4.1 | 3 | 6 | 1.2 | 4.2 | 0.48 | 0.38 | 0.31 | 3.0 | 3.00 | 4.20 | 90 |
| | 3 | 93 | 6.4 | 3 | 6 | 1.6 | 4.5 | 0.64 | 0.51 | 0.41 | 2.9 | 2.91 | 4.48 | 80 |
| | 4 | 90 | 10.0 | 3 | 6 | 2.0 | 4.4 | 0.80 | 0.64 | 0.51 | 2.4 | 2.40 | 4.40 | 80 |
| COMPARATIVE EXPERIMENTS | 1 | 0 | 0 | 3 | 6 | — | — | — | — | — | — | — | — | 50 |
| | 2 | 90 | 0.5 | 3 | 6 | 1.6 | 8.0 | 0.64 | 0.51 | 0.41 | 6.4 | 6.40 | 8.00 | 70 |
| | 3 | 75 | 1.0 | 3 | 6 | 5.0 | 35.0 | 2.00 | 1.60 | 1.28 | 30.0 | 26.01 | 30.00 | 60 |
| | 4 | 80 | 1.4 | 3 | 6 | 3.0 | 18.0 | 1.20 | 0.96 | 0.77 | 15.0 | 12.98 | 15.04 | 60 |

FIG. 8

| ITEMS | 1ST CONDITION | 2ND CONDITION | UNIT |
|---|---|---|---|
| SHAFT DIMENSION | φ53×L25 | | mm |
| SHAFT THICKNESS | t1.5 | | mm |
| OSCILATION | 19000 | | Hz |
| OUTPUT | 600 | | W |
| LUBRICANT | WATER | | – |
| LUBRICATING TEMPERATURE | 10~20 | | °C |
| HORN DIAMETER | φ20 | | mm |
| CLEARANCE | 0.5 | 0.2 | mm |
| TEST TIME | 3 | | min |

FIG. 9

| | SAMPLE NO. | PERCENTAGE(%) OF 2 μm OR LESS Si PARTICLES | AREA COVERAGE(%) OF Si PARTICLES | PLATING THICKNESS (μm) | | CAVITATION TEST | |
| --- | --- | --- | --- | --- | --- | --- | --- |
| | | | | INTERMEDIATE LAYER | OVERLAY | 1ST CONDITION | 2ND CONDITION |
| EXEMPLARY EXPERIMENTS | 5 | 95 | 2.0 | 5.0 | 10.0 | ○ | ○ |
| | 6 | 95 | 2.0 | 0.5 | 2.0 | ○ | ○ |
| | 7 | 90 | 10.0 | 5.0 | 10.0 | ○ | ○ |
| | 8 | 90 | 10.0 | 0.5 | 2.0 | ○ | ○ |
| | 9 | 95 | 2.0 | 0.2 | 5.0 | ○ | × |
| | 10 | 95 | 2.0 | 2.0 | 1.5 | ○ | × |
| | 11 | 90 | 13.0 | 2.0 | 3.0 | ○ | × |

FIG.10

SLIDE MEMBER

CROSS-REFERENCE TO RELATED APPLICATIONS

This application is based upon and claims the benefit of priority from the prior Japanese Patent Application No. 2008-161721, filed on, Jun. 20, 2008 the entire contents of which are incorporated herein by reference.

FIELD

The present invention relates to a slide member including a back metal layer, an Al-based alloy layer, and an overlay.

BACKGROUND

A slide member such as a slide bearing typically used in automobile applications generally comprises a back metal layer coated with Al or Cu based alloy layer. Normally, an overlay is further provided on the surface of the alloy layer to improve bearing properties.

Recent growing increase in engine output has caused slide bearings to be subject to greater surface pressure, and increasing use of low viscosity lubricant oil for achieving improved energy efficiency is causing oil film ruptures and seizures on a more frequent basis. Given such circumstances, there is a need in the industry for a slide bearing with outstanding anti-seizure properties.

One example of a slide member with improved anti-seizure properties is disclosed in patent publication JP 10-77968 A. The disclosed slide member has an overlay formed by electrical Sn plating on the surface of an Al—Si eutectic alloy base material. The maximum surface roughness (Rz) of the Al—Si eutectic alloy base material is maintained at 5.5 μm or less. By keeping the maximum surface roughness (Rz) of the Al—Si eutectic alloy base material at 5.5 μm or less, less bumps are observed on the surface of Sn plating, thus scoring and seizure can be prevented even when sliding takes place under EHL (Elasto-Hydrodynamic Lubrication) with relatively less lubricant oil and higher surface pressure.

The Al—Si eutectic alloy base material generally comprises primary crystal Si particles having relatively large particle size and fine eutectic Si particles. In JP 10-77968 A, the surface of the Al—Si eutectic alloy base material is etched by alkali etching and desmutted prior to being electroplated with Sn. Alkali etching is performed by applying an alkali liquid comprising high concentration of sodium hydroxide solution on the surface of Al—Si eutectic alloy base material while desmutting applies desmutting liquid comprising low concentration of nitric acid etc. Alkali etching and desmutting dissolve primary crystal Si particles and fine eutectic Si particles to reduce the size of primary crystal Si particles and remove most of fine eutectic Si particles. Thus, by reducing the size of or removing Si residing on the surface of the Al—Si eutectic alloy base material, the bumps on the surface of the Al—Si eutectic alloy base material and consequently the bumps on the surface of the overlay are reduced in size.

When bumps, which may also be described as a combination of convexities and concavities are formed on the surface of the overlay, the concavities (or recesses) between the convexities retain lubricant oil to provide improved anti-seizure properties. In employing such approach of retaining lubricant oil between the convexities on the surface of the overlay, distribution and size of the convexities situated in the area in which lubricant is retained, or the so called the lubricant retention area, is considered as an important factor in determining the favorable or unfavorable level of non-seizing properties.

JP 10-77968 A, however, does not address the distribution and size of the convexities of the overlay nor the Al—Si eutectic alloy base material which significantly influences the shape of the convexities residing on the surface of the overlay. As can be seen particularly in JP 10-77968 A, since most of the fine or small sized eutectic Si particles are dissolved by desmutting, the remaining primary crystal Si particles tend to be too far apart from one another. Such excessive spacing between the Si particles on the surface of the Al—Si eutectic alloy base material also results in excessive spacing between the convexities on the overlay surface. Such excessive spaciousness provides grounds for unwanted narrowing of gap between the concavities (between the convexities) and the counterpart slide member when either or both the counterpart slide member and the overlay are deformed (one form of deformation may be a bend). Since lubricant oil is retained in the aforementioned gap, narrower gap results in poor oil retention.

Primary Si particles, initially sizable, are dissolved by desmutting and thus, reduced in size to some extent. However, since the primary Si particles still remain relatively sizable, the convexities produced on the overlay remain relatively sizable as well. Such oversized convexities may prevent smooth lubricant oil flow within the lubricant oil retention area by blocking the flow of lubricant oil into locations in short supply of lubricant oil caused by local contact etc. Such shortage in lubricant oil supply may ultimately lead to seizures.

SUMMARY

The present invention provides a slide member providing outstanding anti-seizure properties.

In one aspect of the present invention, there is provided a slide member provided with an Al-based alloy layer including Si and having a contoured surface including planar surfaces and convexities consisting of Si particles protruding from the planar surfaces; an intermediate layer that coats the Al-based alloy layer; an overlay that coats the intermediate layer; wherein 90% or more of the Si particles protruding from the planar surfaces are configured to have a predetermined particle diameter of 2 μm or less, the Si particles having the predetermined particle diameter being distributed in the Al-based alloy layer with a distance between centers of gravity of the Si particles having the predetermined particle diameter averaging 6 μm or less, and wherein the overlay has a contoured surface including planar surfaces and convexities conforming with the convexities of the contoured surface of the Al-based alloy layer.

FIG. 2A is a reproduction of a microscopic photograph and shows distribution of the Si particles residing on the surface of the Al-based alloy layer immediately before being coated with an Ag intermediate layer. As can be seen in FIG. 2A, each Si particle has its upper portion protruding from the planar surface of the Al-based alloy layer and its lower portion greater than the upper portion submerged below the planar surface. The Si particles protruding from the planar surface of the Al-based alloy layer serve as the convexities on the surface of the Al-based alloy layer, whereas the intermediate portions between the convexities serve as the planar surfaces constituting the concavities. In the present invention, the planar surface is defined as a portion appearing to be substantially straight at the boundary of the laminated layers and the topmost surface of the laminate feature when viewed normal to the cross section taken along the direction of thickness of the laminated layers of the slide member. The planar surface of the Al-based alloy layer is represented by $H_1$ whereas the size of the Si particle is represented by $d_s$ indicating the diameter of the circumscribing circle taken at the portion of the Si particle having the greatest length.

FIG. 2B is a schematic view of the surface of the Al-based alloy layer showing equally spaced Si particles aligned in rows and columns with an assumption that all the Si particles are spherical and have a constant diameter.

FIG. 1 is an enlarged cross sectional view of the laminated features comprising an Al-based alloy layer 1, an Ag intermediate layer 2 (or simply referred to as intermediate layer 2 hereinafter), and an overlay 3. As can be seen in FIG. 1, Ag intermediate layer 2 is coated on the surface of Al-based alloy layer 1 by electrical plating and overlay 3 comprising Bi or Bi alloy is coated on the surface of Ag intermediate layer 2. In FIG. 1, the planar surface residing on the surface of overlay 3, in other words, the planar surface between the convexities is represented by $H_3$. In FIGS. 1 and 2B, the distance between the centers of gravity of the neighboring Si particles measured along a line parallel to planar surface $H_1$ is represented by $d_m$. The thickness of intermediate layer 2, in other words, the distance between planar surface $H_1$ and planar surface $H_2$ of intermediate layer 2 is represented by $t_a$. The thickness of overlay 3, in other words, the distance between planar surface $H_2$ and planar surface $H_3$ is represented by $t_b$. The height of the Si particle protruding from planar surface $H_1$ of Al-based alloy layer 1 is represented by $t_{s1}$. The height of the convexity from planar surface $H_2$ of intermediate layer 2 is represented by $t_{s2}$. The height of the convexity from planar surface $H_3$ of overlay 3 is represented by $t_{s3}$. The distance measured along planar surface $H_1$ between the neighboring Si particles is represented by $d_a$ and the distance measured along planar surface $H_3$ between the neighboring convexities is represented by $d_x$.

As can be seen in FIG. 1 the surfaces of intermediate layer 2 and overlay 3 are contoured so as to follow the bumps formed on the surface of Al-based alloy layer 1. In other words, a portion of the Si particle protrudes by height $t_{s1}$ from planar surface $H_1$ of Al-based alloy layer 1 to form a corresponding convexity of height $t_{s2}$ on the surface of intermediate layer 2 and further a convexity of height $t_{s3}$ corresponding to $t_{s1}(t_{s2})$, thereby forming a lubricant oil retention area between the neighboring convexities on the surface of overlay 3.

According to the above described aspect of the present invention, 90% or more of the Si particles protruding from the planar surface of the Al-based alloy layer are configured to have a particle diameter of 2 μm or less, and such Si particles having 2 μm or less particle diameter are distributed such that their centers of gravity are spaced apart by 6 μm or less in average. It has been found that such configuration provides reduced variance in the height of convexities protruding from overlay 3 to reduce location-based variance in the sizes of the lubricant oil retention areas, and at the same time, prevent excessive spacing being produced between the convexities to yield evenly distributed lubricant oil retention areas on the surface of overlay 3. The above described arrangement of lubricant oil retention areas provide improved lubricant oil retention capabilities, which in turn improves anti-seizure properties.

Further, the lubricant oil retained in the lubricant oil retention area can flow smoothly, without interference of the convexities, into portions in short supply of lubricant oil caused by local contact etc., when 90% or more of the Si particles protruding from the planar surface of Al-based alloy layer 1 have particle diameters of 2 μm or less. Such configuration yields sufficient lubricant oil supply, and more importantly, improves anti-seizure properties.

Slide member such as a slide bearing, more specifically an Al bearing, for example, is generally manufactured by a series of steps including a casting step, a rolling step, a pressure bonding step, a thermal treatment step, a machining step, a surface treatment step, and a plating step. In the casting step, plates of Al-based alloy are cast by a belt cast having advantageous mass production capabilities. Then, in the rolling step, the cast of Al-based alloy is flattened into a thin Al-based alloy sheet which is pressed together with another aluminum alloy sheet constituting a bonding layer to form a multi-layered aluminum alloy sheet. In the subsequent pressing step, the multi-layered aluminum alloy sheet is pressed together with a steel sheet constituting a back metal layer to form a bearing forming plate (the so-called bimetal) which is annealed for several hours in the subsequent thermal treatment step. Then, the bimetal is processed in the machining step and thereafter is subject to surface treatment by alkali and acidic etching liquid in the following surface treatment step. Finally, in the plating step, electroplating is performed to line intermediate layer 2 and to further line overlay 3 on intermediate layer 2 to complete manufacturing of the slide bearing.

In order to obtain Si particles having particle diameters of 2 μm or less, the present invention employs Al-based alloy 1 preferably made of components such as: 1 to 10 mass % of Zn, 3 to 8 mass % of Si, balance of Al and unavoidable impurities; or 1 to 10 mass % of Zn, 3 to 8 mass % of Si, 0.1 to 5 mass % of Cu, 0.05 to 3 mass % of Mg, balance of Al and unavoidable impurities. Such Al-based alloy 1 is processed in a casting step in which the melted Al-based alloy is rapidly cooled at the speed of 30 to 100 degrees Celsius/sec, for example, to crystallize small-crystal eutectic Si particles without allowing crystallization of primary Si particles relatively larger in crystal size as much as possible. Thus, by the time bimetal manufacturing is completed, the Si particles having 2 μm or less particle diameters are spaced apart from each other by an average of 6 μm or less when measured from their centers of gravity. Preferably, the Si particles are all less than 10 μm in particle diameter and the percentage of Si particles greater than 2 μm but equal to or less than 10 μm in particle diameter is 10% or less. More preferably, the percentage of Si particles greater than 2 μm but equal to less than 5 μm in particle diameter is 5% or less, and Si particles greater than 5 μm but equal to less than 10 μm in particle diameter is 1% or less.

In another aspect of the slide member according to the present invention, the distance between the centers of gravity of the Si particles having a particle diameter of 2 μm or less is about 2 to 5 times the average particle diameter of Si particles having the particle diameter of 2 μm or less. Further, the height of the convexities protruding from the planar surfaces of overlay 3 is 0.6 to 1 times the height of the Si particles having the particle diameter of 2 μm or less protruding from the planar surfaces of Al-based alloy layer 1.

It has been found that sufficient distance can be obtained between the convexities of the contoured surface of overlay 3 to prevent joining or overlapping of the skirts of the neighboring convexities to consequently secure sufficient difference in level (height) between the convexities and the concavities required on the surface of overlay 3, when distance $d_m$ between the centers of gravity of Si particles having particle diameters of 2 μm or less is equal to or greater than twice the average particle diameter of Si particles having particle diameter of 2 μm or less. Such configuration allows formation of lubricant oil retention area capable of retaining greater amount of lubricant oil. Favorable lubricant oil retention area can be obtained when distance $d_m$ is equal to or less than 5 times the average particle diameter of Si particles having particle diameter of 2 μm or less. In the present invention, average particle diameter indicates the average $d_s$ at each Si particle.

It has been further found that lubricant oil retention between the convexities on overlay 3 surface (lubricant oil retention area) can be facilitated, when the height of the convexities protruding from the planar surface of overlay 3, in other words, $t_{s3}$ is equal to or greater than 0.6 times the height $t_{s1}$ of the convexities of Si particles having particle diameter of 2 μm or less from the surface of Al-based alloy layer 1. The maximum height the convexity protruding from the planar surface of overlay 3 may take is height $t_{s1}$ ($t_{s1}\times1.0$) of the Si particles protruding from Al-based alloy layer 1.

Yet, in another aspect of the slide member according to the present invention, the average height of the Si particles having the particle diameter of 2 μm or less protruding from the planar surfaces of Al-based alloy layer 1 is 0.1 to 1.0 μm and the average height of the convexities from the planar surfaces of overlay 3 is 0.08 to 1.0 μm, which is favorable in forming the lubricant oil retention area.

Still yet, in another aspect of the slide member according to the present invention, the height of the Si particles having the particle diameter of 2 μm or less protruding from the planar surfaces of Al-based alloy layer 1 is 0.5 times or less a particle diameter of Si particles protruding from the planar surfaces of Al-based alloy layer 1.

Height $t_{s1}$ of the Si particles having particle diameter of 2 μm or less protruding from the planar surface of Al-based alloy layer 1 being equal to or less than 0.5 times the particle diameter of Si particles means that each Si particle has half or more than half of its full height submerged below the Al alloy surface. Such configuration is advantageous in preventing removal of the Si particles from Al-based alloy layer 1.

Still yet, in another aspect of the slide member according to the present invention, the length of each of the planar surface of overlay 3 is greater than the length of each of the planar surface of Al-based alloy layer 1 with which the planar surface of the overlay conforms, meaning that $d_x>d_a$.

In order to realize the above described features on the surface of overlay 3, the surface of the bimetal is electroplated, after the surface treatment step, for forming intermediate layer 2 and further forming overlay 3 on intermediate layer 2. In doing so, it is preferable to perform electroplating for forming overlay 3 at a current density which is about 1.2 to 12 times the current density employed in forming intermediate layer 2 but at 60 to 90% of the current density employed in a normal electroplating process.

It has been found that joining or overlapping of the skirts of the neighboring convexities can be prevented by providing a suitable distance between the convexities formed on the surface of overlay 3. Such configuration allows required difference in level to be obtained between the convexities and the concavities formed on the surface of overlay 3 to form advantageous lubricant oil retention areas that retain sufficient amounts of lubricant oil.

In the present invention, the length of the planar surface indicates the distance between the skirt ends or foot of the neighboring convexities when viewed normal to the cross section taken along the direction of thickness of the laminated layers of the slide member.

Generally, the convexities and the planar surfaces formed by electroplating are in smooth continuation. In such case, the point where the planar surface initiates its elevation in a curve and where shaping of the convexity is initiated is defined as the skirt end.

Measurement of distance $d_x$ taken along the planar surface of overlay 3 is preferably 1.1 to 1.5 times distance $d_a$ taken along the corresponding planar surface of Al-based alloy layer 1.

Still yet, in another aspect of the slide member according to the present invention, the total sum of plane areas of the convexities of the Si particles protruding from the planar surface of Al-based alloy layer 1 is 2 to 10% of plane area of Al-based alloy layer 1. Further, the total sum of the plane areas of the convexities protruding from the planar surface of Al-based alloy layer 1 includes the plane areas of the convexities of Si particles having particle diameters greater than 2 μm, if such Si particles exist.

In order to realize the above described protruding features of the Si particles, the surface of the bimetal is preferably immersed in an alkali etching liquid for a duration of about 1.2 to 2 times the usual time period as well as in a pickling liquor for a duration of about 0.8 to 1.2 times the usual time period.

It has been found that lubricant oil retention area with advantageous oil retention capabilities can be obtained when the sum of the plane areas of the convexities of the Si particles protruding from the planar surfaces of Al-based alloy layer 1 is equal to or greater than 2% of the plane area of Al-based alloy layer 1. The lubricant oil retention area formed under such configuration yields sufficient amount of lubricant oil retention to provide improved anti-seizure properties.

It has been further found that, bonding between Al-based alloy layer 1 and intermediate layer 2 can be maintained at a fair level when the sum of the plane areas of the convexities of the Si particles protruding from the planar surface of Al-based alloy layer 1 is 10% or less than the plane area of Al-based alloy layer 1.

Still yet, in another aspect, the slide member according to the present invention is configured such that the thickness of the above described intermediate layer 2 is 0.5 to 5 μm thick and overlay 3 is 2 to 10 μm thick.

It has been found that sufficient bonding can be obtained while maintaining the strength of intermediate layer 2 by configuring the thickness of intermediate layer 2 at 0.5 μm or greater. Further, by configuring the thickness of intermediate layer 2 at 5 μm or less, bumps (or convexoconcaves) can be readily formed on the surface of intermediate layer 2 that follows the bumps on the surface of Al-based alloy layer 1.

Likewise, it has also been found that sufficient bearing properties can be obtained as well as favorable bonding property of overlay 3 by configuring the thickness of overlay 3 at 2 μm or greater. Further, by configuring the thickness of overlay 3 at 10 μm or less, bumps (or convexoconcaves) can be readily formed on the surface of overlay 3 that follows the bumps on the surface of Ag intermediate layer 2.

Still yet in another aspect, the slide member according to the present invention includes Al-based alloy layer 1 containing 1 to 10 mass % of Zn, 3 to a masse of Si, balance of Al, and unavoidable impurities; intermediate layer 2 having one of Ag, Ag alloy, Cu, and Cu alloy; and overlay 3 having one of Bi and Bi alloy. Still yet, the slide member according to the present invention includes Al-based alloy layer 1 containing 1 to 10 mass % of Zn, 3 to B mass % of Si, 0.1 to 5 mass % of Cu, 0.05 to 3 mass % of Mg, balance of Al, and unavoidable impurities; intermediate layer 2 having one of Ag, Ag alloy, Cu, and Cu alloy; and overlay 3 having one of Bi and Bi alloy.

It has been found that content of 3 to 8 mass % of Si is a favorable amount in facilitating eutectic crystallization while restraining crystallization of sizable primary Si particles. Further 3 mass % or greater amount of Si provides greater efficiency in obtaining the average of 6 μm or less distance between the centers of gravity of the Si particles. By maintaining the content of Si at or less than 8 mass %, excessive crystallization of Si particles onto the surface of Al-based alloy layer 1 can be prevented to provide advantageous bonding between Al-based alloy layer 1 and overlay 3 or intermediate layer 2.

It has been further found that when Al-based alloy layer 1 contains 1 to 10 mass % of Zn, 0.1 to 5 mass % of Cu, and 0.05 to 3 mass % of Mg, these elements form a solid solution with Al to increase matrix strength.

BRIEF DESCRIPTION OF THE DRAWINGS

The features and advantages of the present invention will become clear upon reviewing the following description of the exemplary embodiment of the present invention with reference to the accompanying drawings, in which.

FIG. 2 schematically shows a surface of an Al-based alloy layer, in which 2A is a reproduction based on a microscopic photograph, and 2B is a hypothetical image of equally spaced Si particles arranged in rows and columns;

FIG. 6 is a chart showing components of samples used in anti-seizure test and cavitation test;

FIG. 7 is a chart showing conditions applied in the anti-seizure test;

FIG. 8 is a chart showing the results of the anti-seizure test;

FIG. 9 is a chart showing conditions applied in the cavitation test; and

FIG. 10 is a chart showing the results of the cavitation test.

DETAILED DESCRIPTION

A description will be given hereinafter on one exemplary embodiment of the present invention.

Figure 4:
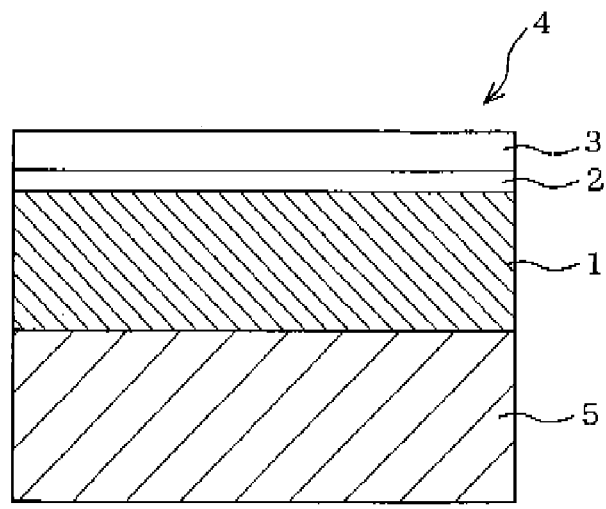
FIG. 4 is schematic cross sectional view of the slide member.

According to one exemplary embodiment of the present invention, a slide member is implemented as a slide bearing comprising laminated layers as can be seen in the schematic cross sectional view depicted in FIG. 4. Slide bearing 4 shown in FIG. 4 includes a back metal layer 5 made of steel, an Al-based alloy layer 1 comprising an Al—Zn—Si alloy, an intermediate layer 2 comprising Ag formed on Al-based alloy layer 1, and an overlay 3 comprising Bi or Bi alloy formed on intermediate layer 2. For the purpose of verifying the advantageous effects of the present invention, samples represented as exemplary experiments 1 to 11 and comparative experiments 1 to 4 indicated in FIG. 6 have been prepared to perform an anti-seizure test and a cavitation test.

To describe the method of preparing the samples, first, an Al-based alloy being composed according to FIG. 6 was melted and thereafter cooled at the speed indicated in FIG. 6 in the casting step to form a plate made of Al-based alloy. Then the plate was thinned into a sheet by applying pressure by way of rolling etc., and the thinned sheet of Al-based alloy was pressed together with a steel plate constituting a back metal layer to form a bimetal. The bimetal, after being annealed, was bent into a semicircular shape to obtain a semicircular slide bearing, in this case, a half bearing. Then, the surface of Al-based alloy layer 1 of the bearing was electrolytically degreased as a preparatory step and thereafter plated to form Ag intermediate layer 2. Finally, Bi overlay 3 was plated on intermediate layer 2 to obtain each of the samples. In exemplary experiments 1 to 11, electrical plating for forming intermediate layer 2 and overlay 3 were performed after alkali etching Al-based alloy layer 1 with an immerse time of 90 seconds and thereafter pickling the etched feature with an immerse time of 60 seconds. Then, intermediate layer 2 was electroplated at a current density of 0.8 to 3 A/dm² and overlay 3 was similarly electroplated at a current density of 0.9 to 4 A/dm², respectively for a predetermined duration suited for their thickness. Temperature of the plating liquid was set at 25 to 40 degrees Celsius for both cases.

Cross sectional images of samples obtained by the above described exemplary experiments 1 to 11 and comparative examples 1 to 4 were taken by a microscope. Dimensions such as plating thickness, $d_s$ and $d_m$, etc., were taken at different locations and the average values of such dimensions are indicated in FIG. 8. The schematic view given in FIG. 2A represents exemplary experiment 1.

The conditions applied in the seizure tests for exemplary experiments 1 to 11 and 1 to 4 are indicated in FIG. 7 and the test results are indicated in FIG. 8.

The following provides an analysis on the above described tests.

The results of the anti-seizure test show that 90% or more of the Si particles protruding from the surface of Al-based alloy layer 1 had a particle diameter of 2 μm or less and among such Si particles having a particle diameter of 2 μm or less, exemplary experiments 1 to 11 in which the centers of gravity of Si particles were spaced apart from each other by an average of 6 μm showed more favorable anti-seizure properties relative to comparative experiments 1 to 4. It can be understood from comparing exemplary experiments 1 to 4 and comparative experiments 1 to 4 that the Si particles protruding from the planar surface of Al-based alloy layer 1 provide favorable anti-seizure properties when the particle diameters of 90% or more of the Si particles are 2 μm or less and when centers of gravity of such Si particles having particle diameters of 2 μm or less are spaced apart by an average of 6 μm or less. It can further be understood from the comparison of exemplary experiments 1 and 2, and exemplary experiments 3 and 4 that the Si particles protruding from the planar surface of the Al-based alloy layer provide favorable anti-seizure properties when the sum of plane areas of the convexities of the Si particles protruding from the surface of the Al-based alloy layer is 2 to 5% of the plane area of the Al-based alloy layer.

Figure 5:
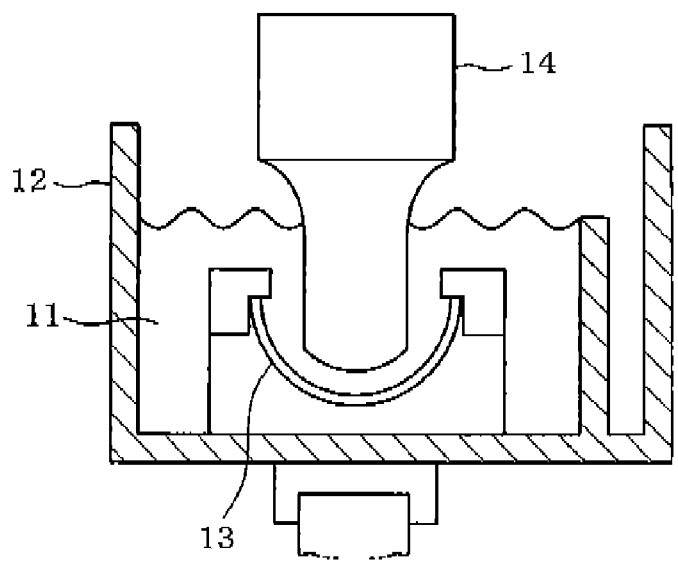
FIG. 5 shows a schematic configuration of a cavitation testing machine.

Further, cavitation tests were performed for evaluating plating bonding property. The cavitation tests were performed using the testing machine shown in FIG. 5 under the conditions indicated in FIG. 9 More specifically, the cavitation tests were performed, as shown in FIG. 5, by placing a sample 13 inside a water tub 12, and impinging ultrasonic waves of 19000 Hz for 3 minutes on the slide surface of sample 13 in water 11. The ultrasonic waves are discharged from an ultrasonic wave producing horn 14 with a clearance of a predetermined measurement of 0.5 mm, for example. The above described condition is identified as the first condition. After the test, a verification was made as to whether or not overlay 3 or intermediate layer 2 have been peeled, and the results are indicated in FIG. 10 by marking a "○ (circle)" if not peeled and an "x" if peeled.

The result of the cavitation test show that exemplary experiments 1 to 11 in which the centers of gravities of the Si particles having a particle diameter 2 μm or less were spaced apart from each other by an average of 6 μm or less have favorable bonding property. For verification of even higher bonding, experiments 5 to 11 were tested under stricter conditions in which the clearance was reduced to 0.2 mm. This stricter condition is identified as the second condition. It can be understood from comparing exemplary experiments 5 to 8 with 9 and 10 that Al-based alloy layer 1 shows outstanding bonding with overlay 3 through bonding with intermediate layer 2 when plating of intermediate layer 2 is 0.5 µm thick or greater and plating of overlay 3 is 2 µm thick or greater. It can be understood from comparing exemplary experiments 5 to 8 with exemplary experiment 11 that Al-based alloy layer 1 shows outstanding bonding with overlay 3 and intermediate layer 2 when the total sum of the plane areas of the convexities of the Si particles protruding from the surface of Al-based alloy layer 1 is equal to or less than 10% of the plane area of overlay 3.

It was further found that the slide member of the present invention provides the following advantages when overlay 3 is made of Bi.

Figure 1:
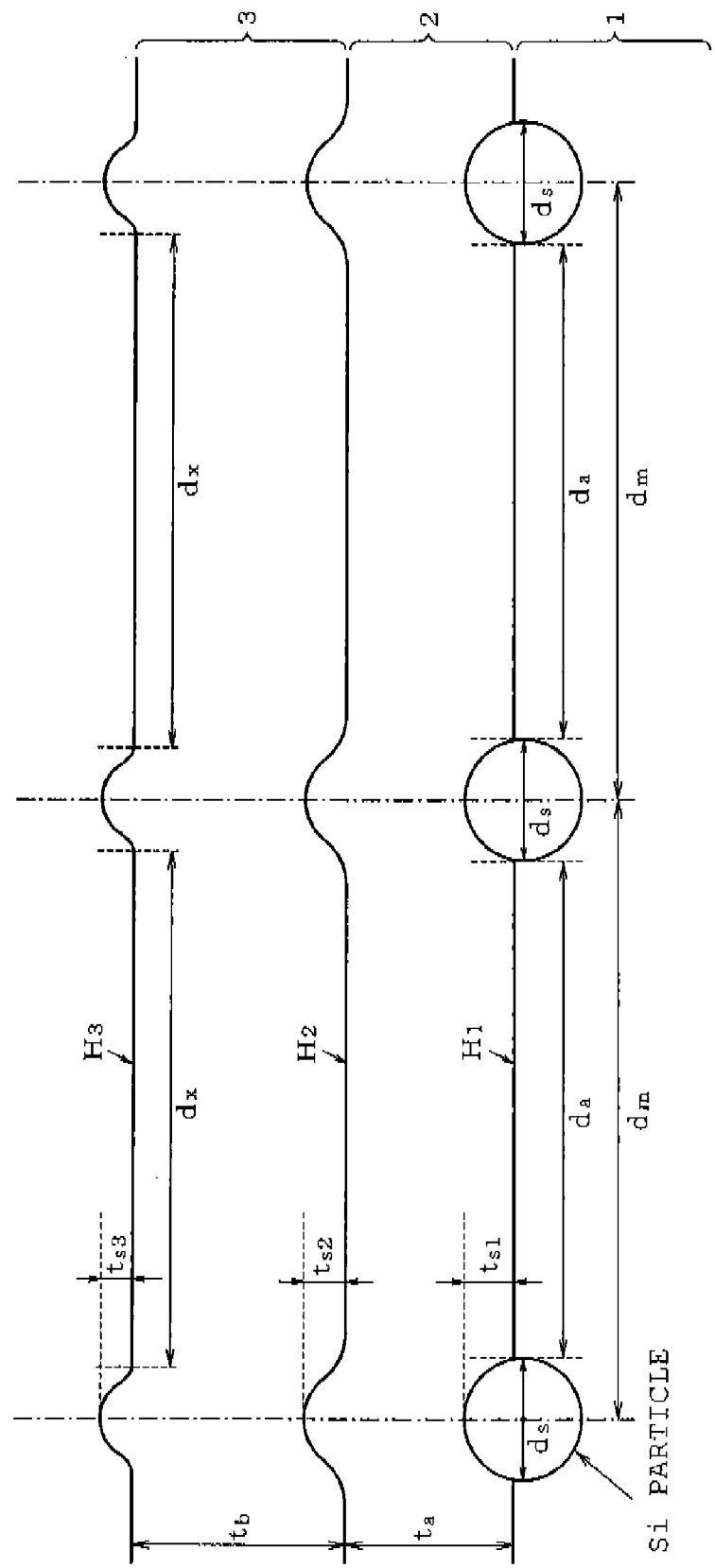
FIG. 1 is schematic cross sectional view of a slide member according to one aspect of the present invention.
Figure 3A:
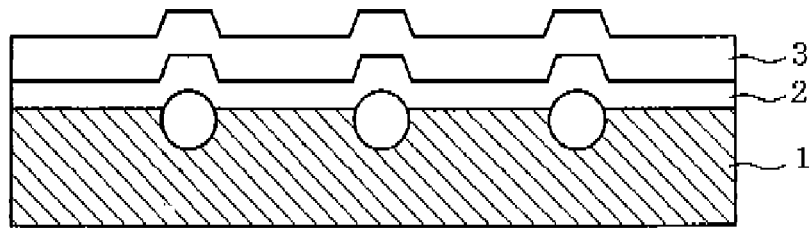
FIGS. 3A to 3D show the lifecycle of bismuth oxide formed on an overlay.
Figure 3B:
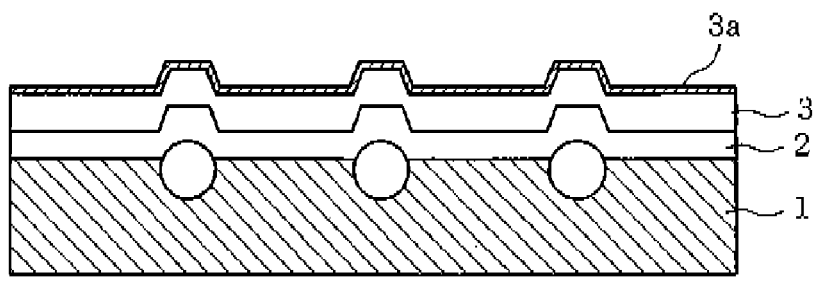
Figure 3C:
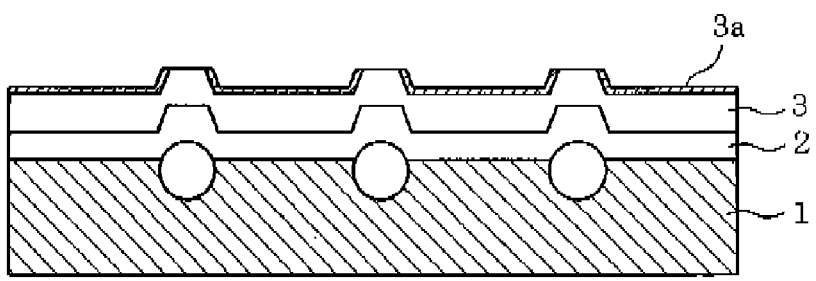
Figure 3D:
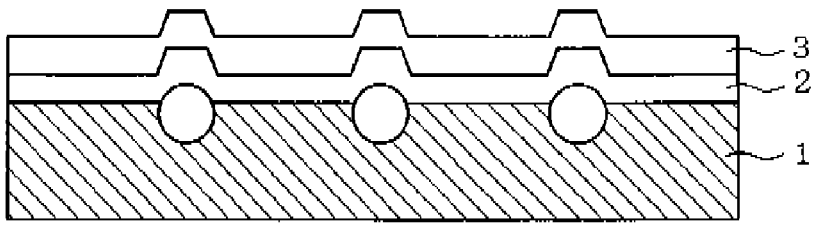

Bi is easily oxidated and the resulting oxide film readily breaks away or is delaminated from the underlying structure on which it is formed. FIG. 3A shows overlay 3 immediately after its formation, FIG. 3B shows overlay 3 after use in an engine exposed to high temperature. As can be seen in FIG. 3B, an oxide film (bismuth oxide) 3*a* is formed on the surface of overlay 3. FIG. 3C shows oxide film 3*a* residing on the convexities being peeled by friction with the counterpart slide member, whereas on the concavities between the convexities, in other words, the oil retention area, oxide film 3*a* is naturally removed by deformation of overlay 3 by variable load etc., such that the height of the convexities return to their original height $t_{s3}$ as shown in FIG. 3D. The removal of oxide film 3*a* reproduces concavities (lubricant oil retention area) which are substantially identical in depth to the original.

Overlay 3, being contoured, supports the counterpart slide member with its convexities. The wear of the convexities may be accelerated through provision of such support. Still, the above described configuration prevents height $t_{s3}$ from being lowered from its original height and thus, prevents reduction in lubricant oil retention, and moreover, actively prevents overlay 3 from losing its lubricant oil retention capabilities.

In the present invention, concavities comprising planar surfaces are defined between the convexities. The planar surfaces may have recesses created by lost Si particles etc. In such case, intermediate layer 2 and over layer 3 will also be recessed so as to conform with Al-based alloy layer 1 but such irregularity is acceptable.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

What is claimed is:

1. A slide member comprising:
    an Al-based alloy layer including Si and having a first contoured surface comprising first planar surfaces and first convexities consisting of Si particles protruding from the first planar surfaces;
    an intermediate layer that coats the Al-based alloy layer; and
    an overlay that coats the intermediate layer;
    wherein 90% or more of the Si particles protruding from the first planar surfaces are configured to have a predetermined particle diameter of 2 µm or less, and
    wherein the Si particles having the predetermined particle diameter are distributed in the Al-based alloy layer such that a distance between centers of gravity of the Si particles having the predetermined particle diameter 1) averages 6 µm or less, and 2) is equal to or greater than twice an average particle diameter of the Si particles having the predetermined particular diameter, and
    wherein the overlay has a second contoured surface comprising second planar surfaces and second convexities conforming with the first planar surfaces and the first convexities of the first contoured surface.

2. The slide member according to claim 1, wherein the distance between the centers of gravity of the Si particles having the predetermined particle diameter is 2 to 5 times an average particle diameter of the Si particles having the predetermined particle diameter, and a height of the second convexities from the second planar surfaces is 0.6 to 1 times a height of the Si particles having the predetermined particle diameter from the first planar surfaces.

3. The slide member according to claim 1, wherein an average height of the Si particles having the predetermined particle diameter from the first planar surfaces is 0.1 to 1.0 µm and an average height of the second convexities from the second planar surfaces is 0.08 to 1.0 µm.

4. The slide member according to claim 1, wherein a height of the Si particles having the predetermined particle diameter from the first planar surfaces is 0.5 times or less a particle diameter of the Si particles protruding from the first planar surface.

5. The slide member according to claim 1, wherein a length of each of the second planar surface is greater than a length of each of the first planar surface with which each of the second planar surface conforms.

6. The slide member according to claim 1, wherein total plane area of the first convexities is 2 to 10% of plane area of the Al-based alloy layer.

7. The slide member according to claim 1, wherein the intermediate layer is 0.5 to 5 µm thick, and the overlay is 2 to 10 µm thick.

8. The slide member according to claim 1, wherein the Al-based alloy layer comprises 1 to 10 mass % of Zn, 3 to 8 mass % of Si, balance of Al and unavoidable impurities, and wherein the intermediate layer comprises one of Ag, Ag alloy, Cu and Cu alloy, and the overlay comprises one of Bi and Bi alloy.

9. The slide member according to claim 1, wherein the Al-based alloy layer comprises 1 to 10 mass % of Zn, 3 to 8 mass % of Si, 0.1 to 5 mass % of Cu, 0.05 to 3 mass % of Mg, balance of Al and unavoidable impurities and wherein the intermediate layer comprises one of Ag, Ag alloy, Cu and Cu alloy, and the overlay comprises one of Bi and Bi alloy.

* * * * *